April 11, 1939.  L. J. PETTETT  2,153,991
SEED DRILL
Filed Oct. 26, 1937  4 Sheets-Sheet 2

INVENTOR.
LEVI JACK PETTETT
BY
ATTORNEY.

April 11, 1939.                L. J. PETTETT                2,153,991
                                 SEED DRILL
                            Filed Oct. 26, 1937          4 Sheets-Sheet 3
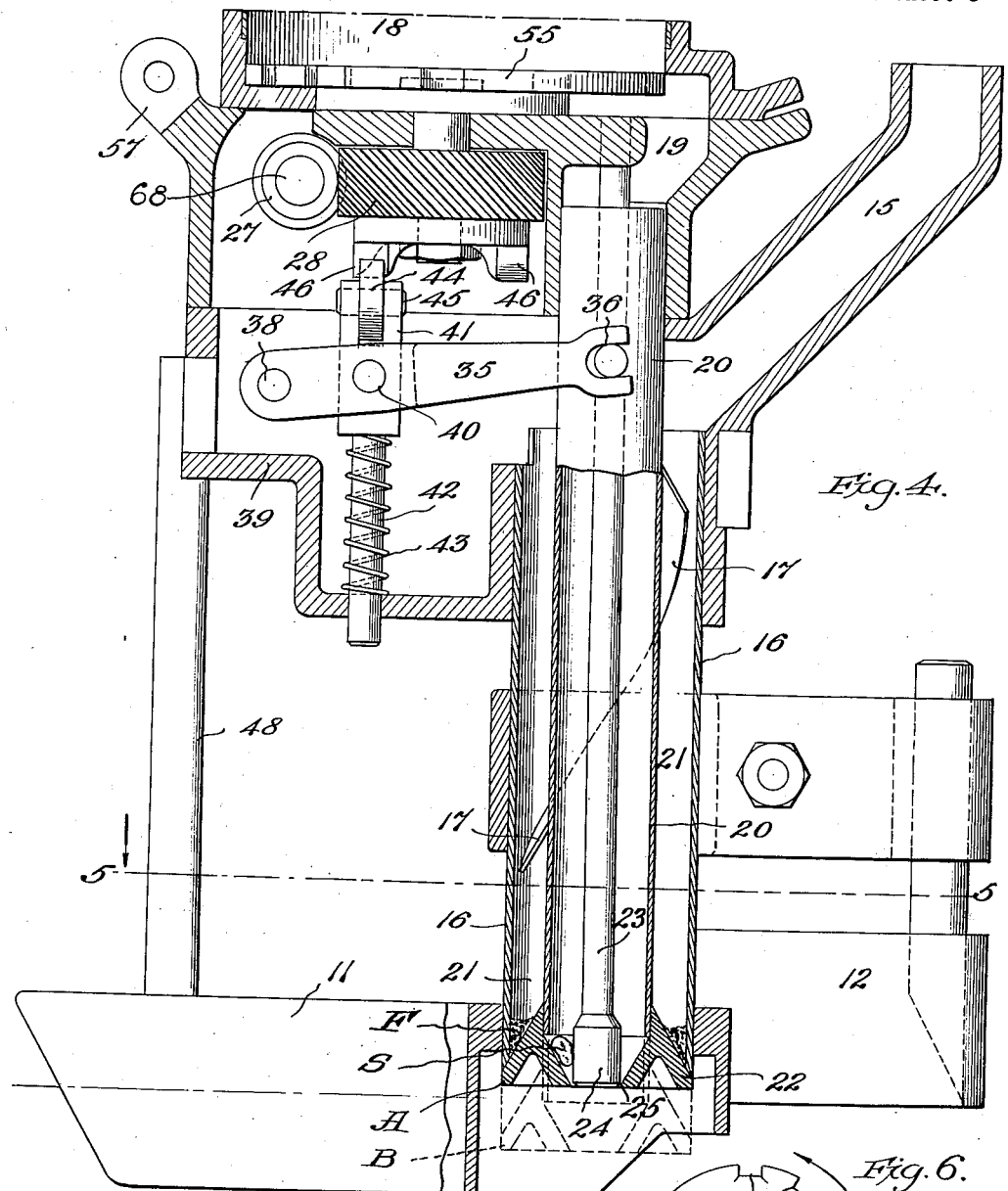
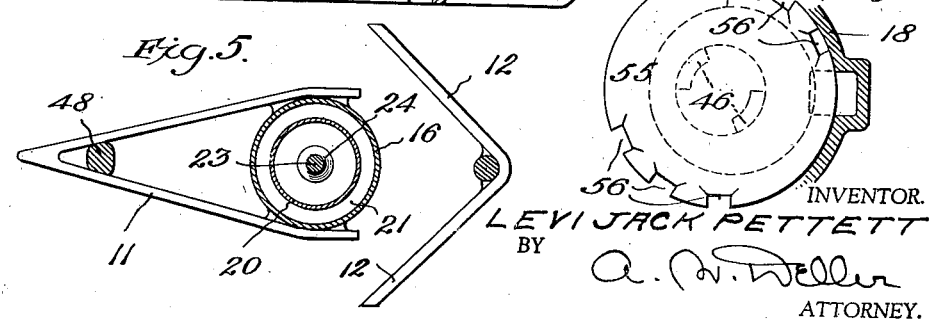
INVENTOR.
*LEVI JACK PETTETT*
BY
ATTORNEY.

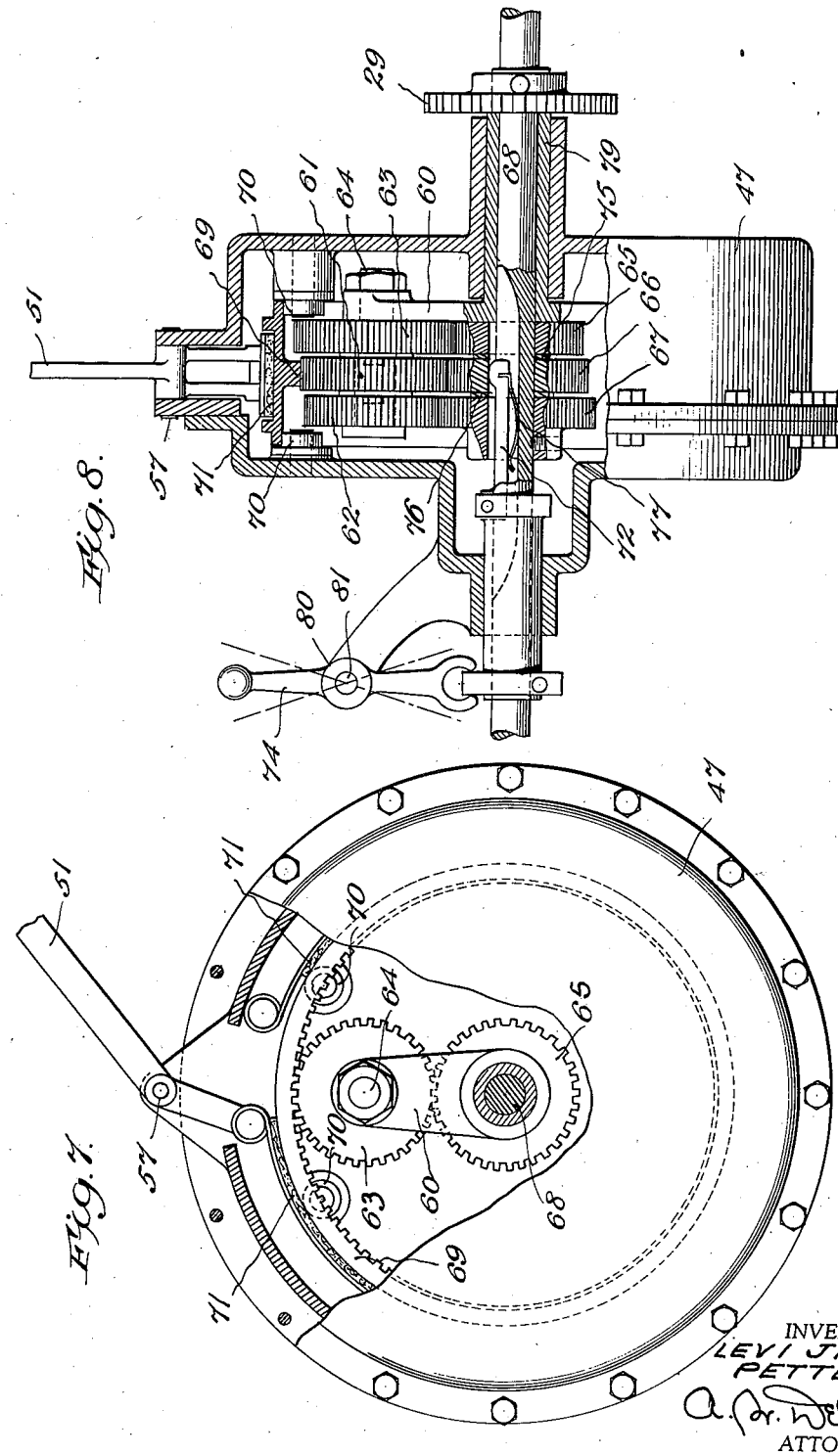

Patented Apr. 11, 1939

2,153,991

UNITED STATES PATENT OFFICE 2,153,991

SEED DRILL

Levi Jack Pettett, Lockland, Ohio

Application October 26, 1937, Serial No. 170,995

9 Claims. (Cl. 111—80)

The present invention relates to seed drills, and more particularly to a seed drill equipped with a common seed and fertilizer dropping mechanism for use in connection with seed drills having furrow openers producing a furrow having a substantially flat bottom of greater width than furrows opened by conventional seed drill plows.

It has long been recognized that in the planting of seed in orderly rows the conventional method of erecting a check-wire has many disadvantages. In addition, conventional drills usually have been designed with separate controlling mechanisms for the delivery of seed and fertilizer. Furthermore, the conventional plow or furrow opener has been of such shape that the furrow has been V or triangular in form. The shape of the furrow has necessitated that either the seed and fertilizer were subjected to mutual contact or were deposited at different depths.

A recent improvement in seed drills has provided the art with a mechanism for depositing the fertilizer as an ellipse or in parallel bands at a different depth in the soil than that at which the seed is deposited. However, it is known that even these improvements have not resulted in the attainment of the most desirable conditions. The effect of depositing fertilizer at the same depth as the seed in comparison with the deposition of the fertilizer at a different depth is brought out very well by recent studies of the problem, the results of which have been published.

When beans were fertilized by placing the fertilizer two inches below the seed, the yield was 2706 pounds per acre for 300 pounds of fertilizer. When 300 pounds of fertilizer were deposited in bands 1.5 inches to the sides of the seed, the yield was 3898 pounds per acre. This was an increase of 44% as a result of the change of the spatial relationship of the seed and fertilizer. It is to be appreciated that the fertilizer at the ends of the bands or at the ends of the major axes of an ellipse is at a greater distance from the seed than that near the middle of the parallel bands or at the ends of the minor axes of an ellipse. This fact should be borne in mind since a small difference in the distance at which the fertilizer is placed from the seed makes considerable difference in the efficiency of the fertilization. This is brought out quite clearly by the following. When the fertilizer is placed in bands at approximately the same level as the seed the yield of beans was increased by 44%. A change of one inch in the distance between the seed and the fertilizer resulted in a difference in the yield of beans of 603 pounds per acre when the same small amount of fertilizer (300 pounds per acre) was used. Thus although many attempts have been made to solve this vexatious and difficult problem of depositing the seed and fertilizer efficiently, none so far as I am aware have been wholly successful when carried into practice on a commercial scale.

It is an object of the present invention to provide a common dropping mechanism for seed and fertilizer.

It is another object of the present invention to provide a means for depositing fertilizer at substantially the same depth as the seed and in such manner that substantially all the fertilizer is equidistant therefrom but not in contact therewith.

It is a further object of the present invention to provide a means of opening the soil in such manner as to provide a furrow having a substantially flat bottom of appreciable width.

The present invention also contemplates providing a dropping mechanism for both seed and fertilizer with positive control through a common element.

It is also within the contemplation of the present invention to provide a means integral with the seed drill for controlling the interval between successive depositions of seed and fertilizer.

Other objects and advantages will become apparent to those skilled in the art from the following description taken in conjunction with the accompanying drawings in which Fig. 1 is a side elevation of a drill embodying the principles of the present invention.

Fig. 4 is a vertical sectional view of a dropping mechanism embodying the principles of the present invention.

Fig. 5 is a reduced cross sectional view taken on the line 5—5 of Fig. 4 to show the furrow opener and rake embodying the principles of the present invention.

Fig. 6 is a top elevational view of a metering device for controlling the deposition of seed embodying the principles of the present invention.

Fig. 7 is a side elevation of a gear box embodying the principles of the present invention with parts broken away for reasons of clarity; and Fig. 8 is a vertical sectional view with parts in elevation and parts broken away for reasons of clarity of a gear box embodying the principles of the present invention.

Figure 1:
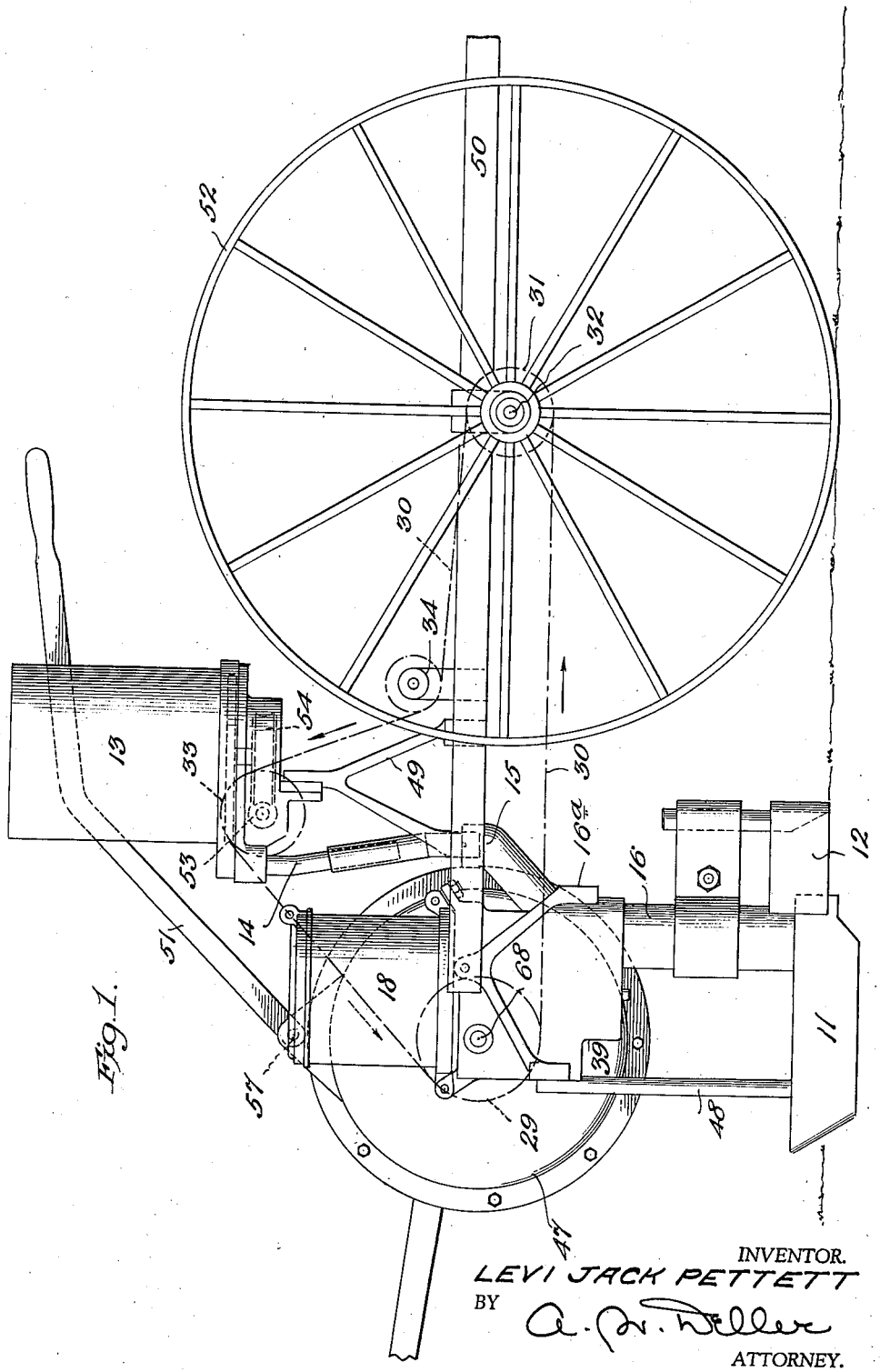

Broadly stated, my improved seed drill includes the conventional running gear for a vehicle of this type and, in addition, a special plow or furrow opener, a special seed and fertilizer distributing mechanism and means integral with the drill for controlling the spacing of successive depositions of seed and fertilizer. By means of the furrow opener of special design or a similar device the soil is opened in such a manner that the furrow has a bottom of substantial width. By means of an arm driven through appropriate gears the valves through which the seed and fertilizer are deposited are opened and closed by a common element. The operation of the valves is coordinated with the feeding of the seed from the hopper to the drilling member. By means of a gear box the spaces between successive depositions of seed is controlled. The engagement and disengagement of the moving parts is accomplished by means of a clutch mounted upon the gear box. In this way it is possible to start and stop the deposition of seed and fertilizer as well as control the distance between successive hills.

Referring particularly to Figs. 1, 4 and 5, 11 is a wedge shaped shoe or plow for opening the soil preparatory to depositing the seed and fertilizer. Of course, there may be a plurality of such shoes or plows. After the seed and fertilizer have been deposited, spring drag teeth, two discs,—rake 12 or a similar device throws the soil back into the furrow. Fertilizer is contained in a conventional hopper 13 provided with a conventional metering plate. A flexible tube 14 and a channel 15 form a conduit connecting the fertilizer hopper and metering device 13 with the outer casing of tube 16 of the dropping mechanism. Casing 16 is provided with a baffle 17. Fertilizer F accumulates between depositions in a manner such as indicated in Fig. 4.

A conventional seed hopper 18 is provided with a special metering plate 55 provided with notches 56. Hopper 18 opens into a channel 19 which connects with tube or casing 20 coaxial with casing 16 and slidably mounted therein. Predetermined quantities of seed S are maintained as indicated in Fig. 4 during the interval elapsing between depositions of seed and fertilizer. A space 21 of suitable dimensions is formed between tube 20 and casing 16 through which the fertilizer drops. Toward the lower extremity of tube 20 is a wing-like appendage 22 which acts as a valve to shut off the flow of seed and fertilizer from tube 20 and casing 16. Centrally disposed within tube 20 and coaxial therewith is a rod 23 provided with an enlargement or valve plug 24 at the lower extremity. Valve 25 is closed by plug 24 when 22 is in position A (Fig. 4). Valve 25 is open when 22 is in position B (Fig. 4).

The special metering plate provided in hopper 18 is driven by spiral gears 27 and 28 having a 2:1 ratio which in turn are driven through gear box 47 by sprocket gear 29 having 14 teeth. Sprocket 29 is in turn driven from the wheels 52 by means of chain 30 and sprocket 31 mounted on wheel axle 32. Chain 30 also provides means for the transmission of power to sprocket 33 which drives the fertilizer metering device under hopper 13 through gears 53 and 54. A means of maintaining substantially constant tension on chain 30 is provided at 34.

Motion is imparted to tube 20 by means of arm 35 pivotably attached at 36 to tube 20 and at 38 to frame 39. Arm 35 is pivotably mounted at 40 to push rod 41 slidably mounted on rod 42 and working against the helical spring 43. Rod 41 is provided with a roller 44 journaled at 45 near the upper end of the push rod 41. Roller 44 engages the operative surface of cam 46. Cam 46 is driven by gears 27 and 28. Elements 16a, 39, 48, 49 and 50 together with others not shown form the frame with which the other elements are associated. It is obvious that element 48 together with the casing 16 form the rigid support for plow 11 and rake 12. The lever 51 pivoted at 57 provides means for actuating the clutching mechanism and gear ratio changing means in connection with gear box 47.

Figs. 7 and 8 provide a detailed view of the planetary gear box 47 for changing the relative speed of gear 27 with respect to axle 32 and for engaging or releasing the means of power transmission.

In order that those skilled in the art may have a better understanding of the present invention, the operation of my improved seed and fertilizer dropping mechanism will be described in connection with the planting of corn, although it is to be understood that other seeds may be dropped by means of the improved seed drill.

After the soil has been prepared for drilling my improved drill is especially advantageous for drilling in the seed simultaneously with the deposition of accurately measured quantities of fertilizer. As is well known to those skilled in the art, the optimum conditions for most efficient utilization of fertilizer are those in which the fertilizer is placed at substantially the same level as the seed and in such a manner that substantially all the particles of fertilizer are practically equidistant from the seed. My improved plow or furrow opener or a similar device establishes a furrow which is ideal for such spatial relationship between the seed and the fertilizer. As is readily seen in Fig. 5 my improved plow is of wedge shape and so designed as to insure that the furrow will have a substantially flat surface at the bottom. The bottom of the furrow is of sufficient width to provide ample space for the fertilizer to be placed in a circle around the seed with the seed as the approximate center. Thus, that which cannot be done with the usual type of furrow opener of say, the common disk or similar type, is readily accomplished with a plow or furrow opener of the shape of my improved plow or one of similar design. It will be appreciated that my improved furrow opener leaves a furrow which may be described as trapezoidal in shape with the sides at an angle with the bottom greater than a right angle. However, the geometric figure to which the shape of the furrow may be compared is of less importance than the production of a furrow with a bottom of substantial width in which practically all points lie in substantially the same plane. While I prefer to use my improved plow, any plow or furrow opener that will produce a furrow having a flat bottom with sufficient width to permit depositing all of the fertilizer at substantially equal distances from the seed or as a circle of which the seed is the center may be employed.

It is to be observed that by the use of my improved seed drill it is possible for the user thereof to dispense with the conventional check-wire. This improvement is possible through the use of the planetary gear box 47. By means of this gear box the operator of my improved drill may set the dropping mechanism to deposit seed and fertilizer at predetermined intervals and also to start or stop the dropping mechanism at the beginning or end of a row. To those skilled in the art this advantage will be appreciated especially in connection with drilling corn or other seeds for which it is desirable to sow a field in regular rows.

Having prepared the field for drilling, the operator by means of gear box 47 sets the spiral gear 27 to impart a desired speed to plate 55 and thereby deposit the seed contained in hopper 18 at stated intervals. Seed plate 55 makes one-half revolution for each deposit of seed and is provided with two sets of seed notches placed at 180°. Cam 46 likewise is provided with two lobes placed at 180°. By this arrangement the peripheral speed of plate 55 is kept low permitting the seed notches 56 to fill more readily. The seed drops out of the hopper as the notches 56 pass the outlet of the hopper 18. Arm 35 is moved up and down at predetermined intervals by means of push rod 41 acting against helical spring 43 which acts to close valve 25 as rapidly as the rotation of cam 46 will permit. Push rod 41 is actuated by means of gear 28 acting through cam 46. As a result of the motion of arm 35, tube 20 drops and rises to open and close the valve at 25. The rotating cam 46 acting through roller 45 imparts an acceleration of less than 32 feet per second to the tube 20 and will close the valve 25 as rapidly as spring 43 will permit. Since the fertilizer must fall farther than the seed, the length of the fixed plug 24 is so arranged that the seed is released just as the fertilizer passes the point where the end of the fixed plug 24 clears the seed, allowing the seed and fertilizer to fall to the bottom of the furrow together.

With the gears 27 and 28 set to operate at the required speed to deposit the seed at the desired intervals the drill is brought to the head of the row and the gears thrown into engagement by means of lever 51. Seed is carried in hopper 18 and fertilizer is carried in hopper 13. By means of a conventional metering device at the bottom of hopper 13 fertilizer is delivered in a substantially constant stream to flexible tube 14. Motion is imparted to the metering device by sprocket wheel 33 through gears 53 and 54. From 14 the fertilizer passes under the influence of gravity to channel 15 and from that conduit the fertilizer passes to the fixed casing 16. In passing down through 16 the baffle 17 ensures that the fertilizer F will be evenly distributed around the entire periphery of tube 20 as indicated in Fig. 4. Thus, it is certain that the fertilizer will be in a position to be deposited in a circle or annulus when the valve 25 opens as a result of the displacement of tube 20 in a downward position. In this manner the deposition of both seed and fertilizer is controlled by a common means.

Seed is stored in hopper 18 and by means of the special metering plate 55 is discharged through the notches 56 into channel 19. From the channel 19 the seed is delivered into the movable tube 20 in accurately measured quantities. By positioning the lobes of the cam 46 in proper relation to the seed notches 56 the valve 25 can be made to open during the time when plate 55 is not admitting seed to the seed chamber or tube 20. Motion is imparted to gears 27 and 28 through gear box 47 by means of chain 30 operating through sprocket wheel 29. The downward movement of the arm 35 opens the valve 25 to permit a metered amount of seed S (Fig. 4) to drop into the furrow and at the approximate center of a ring or annulus of fertilizer. Since the fertilizer at the bottom of chamber 21 must fall further than the seed the length of the fixed plug 24 on rod 23 is so arranged that the seed is released just as the fertilizer passes the point where the end of the fixed plug 24 clears the seed, allowing the seed and the fertilizer to fall to the bottom of the furrow simultaneously. After the seed and the fertilizer have been deposited rake 12 or some similar device throws or pushes the soil or earth back into the furrow thus covering the seed and the fertilizer.

The operation of the spacing mechanism of my improved seed drill will be readily appreciated by reference to Figs. 7 and 8. Fig. 7 is a side elevation of planetary gear box 47 with parts broken away for reasons of clarity. Fig. 8 is a vertical sectional view with parts in elevation and parts broken away of gear box 47. Referring more particularly to Fig. 8 sprocket wheel 29 is keyed to tubular shaft 79 and drives planet wheel 61 through arm 60. Planet wheels 61, 62 and 63 are keyed together and are free to rotate as a unit on stud 64. Gears 65, 66 and 67 are free to rotate on shaft 68. The internal gear 69 is carried on a series of rollers 70 which hold gear 69 concentric with shaft 68. With sliding key 72 in the position shown in Fig. 8 and the internal gear 69 locked by means of band 71 and lever 51, the drive is from sprocket 29, through arm 60, through planet gear 61, to gear 66 which is, of course, under these circumstances now keyed to shaft 68 by the sliding key 72 held in position by spring 77. With the gears set in this position the drill deposits seed at approximately 42 inch centers. With sliding key 72 shifted so that gear 65 is keyed to shaft 68, the drill deposits seed at approximately 36 inch centers, and the drive is from sprocket 29 through arm 60, to planet gear 61, thence to planet gear 63, to planet gear 65 and thence to shaft 68. With the gear 67 keyed to shaft 68 the planter deposits seed at approximately 48 inch centers and the drive is from sprocket 29 through arm 60, planet gear 61, planet gear 62 to gear 67 and thence to shaft 68. Washers 75 and 76 cause key 72 to recede into a milled recess in shaft 68 as key 72 is moved from one position to another by means of handle 74. Handle 74 is of the conventional type and pivoted at 80 on a fixed pin 81. By means of band 71, the depositing mechanism is thrown out of gear whenever it is desirable or necessary.

Figure 2:
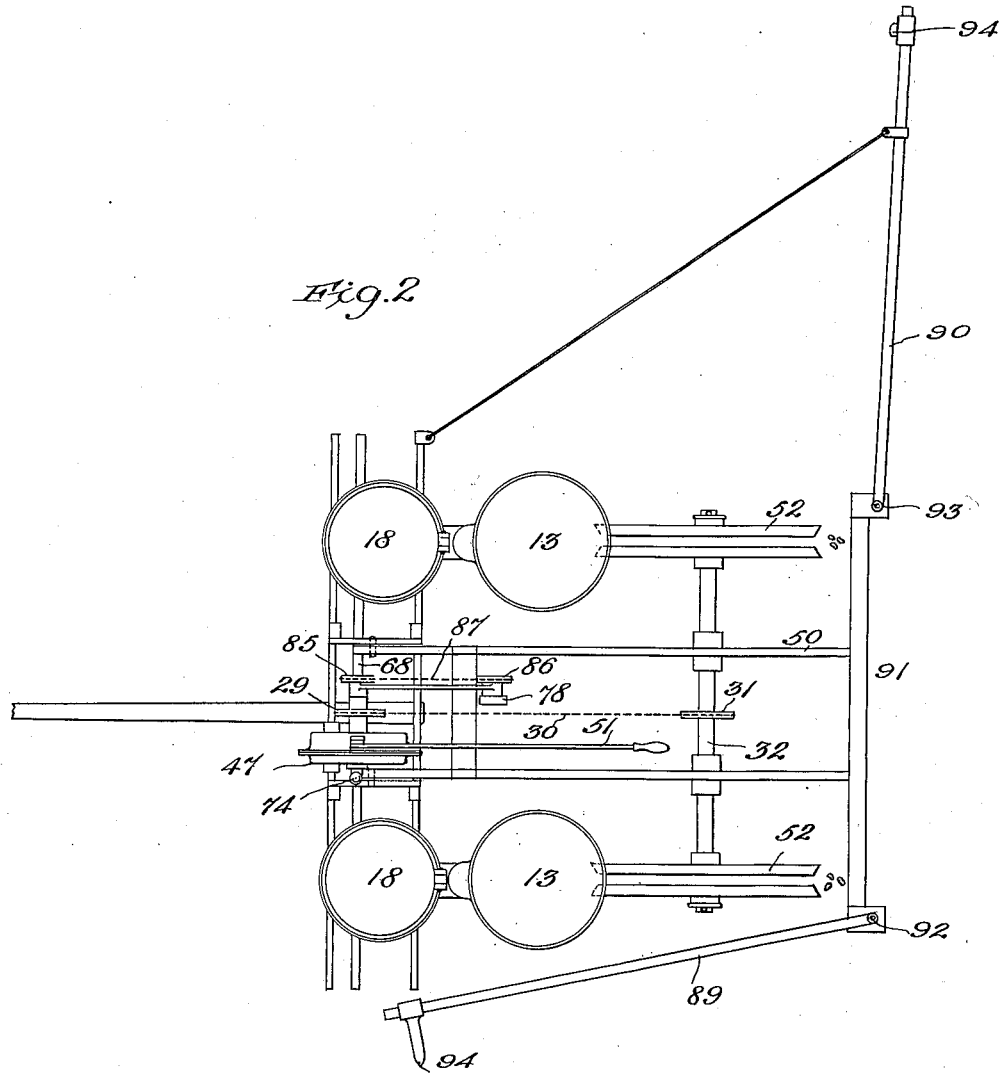
Fig. 2 is a top view of a drill embodying the principles of the present invention.
Figure 3:
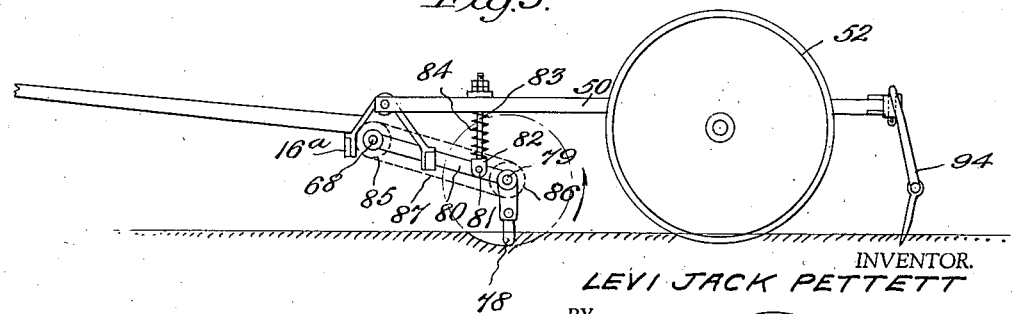
Fig. 3 is a side elevation of a drill with parts broken away for reasons of clarity to show the marking elements.

For the purpose of providing guides for the operator a marker 78 (Figs. 2 and 3) is preferably located on the longitudinal median line of the seed drill frame and is rotatably mounted on shaft 79. Shaft 79 is journaled in element 80. The member 80 is pivotally mounted on shaft 68. Arm 80 is likewise pivotably mounted at 81 on the head 82 of the plunger 83. By means of spring 84 member 80 is resiliently held in a position to allow marker 78 to rotate on shaft 79 and make a mark at the site of each deposition of seed and fertilizer. By means of sprocket 85 mounted on shaft 68 and sprocket 86 mounted on shaft 79, marker 78 rotates in a ratio of 1:1 with the shaft 68 through chain 87. Thus each time seed and fertilizer are deposited marker 78 scores the soil.

Arms 89 and 90 (Fig. 2) pivoted to the frame 91 at 92 and 93 are provided with the conventional marker blades 94 for the purpose of providing a means for marking parallel rows.

When starting to drill a row the operator positions the drill and the marker 78 is directly over the desired starting point, locks lever 51 in the operating position and proceeds with the planting. Since shaft 68 makes one revolution for each deposition of seed and marker 78 revolves at a 1:1 ratio with 68 it is apparent that every time the planter deposits seed and fertilizer marker 78 scores the soil. Of course this marker is not necessary when not planting in the so-called check row fashion.

It is to be observed that my improved drill insures that the seed and the fertilizer will be deposited at substantially the same level. Deleterious effects resulting from mutual contact of fertilizer and seed are eliminated by my improved drill while at the same time the beneficial effects of optimum spatial relationship of each seed and fertilizer are obtained efficiently and in a practical manner. The fertilizer is deposited in such a manner that practically all of the fertilizer is substantially equidistant from the seed. As a result of the design of my improved drill the seed and fertilizer are delivered in measured quantities at successive predetermined intervals without the use of the conventional time consuming checkwire. The driven gears controlling the deposition of the seed and fertilizer are released and engaged by means of a simple mechanism. The magnitude of the intervals between successive depositions of seed and fertilizer is controlled by the same mechanism in a simple and fool-proof manner. Furthermore, seed and fertilizer are deposited from separate tubes cooperatively controlled through a common mechanism by a single moving element. By means of the gear box 47 the deposition of the seed and the fertilizer is started and stopped at the desired places in a simple effective manner by means of a mechanism integral with the drill. It is obvious that motion is imparted to the various gears and moving parts of my improved drill from the displacement of the drill, by means of chain 30 and sprocket 31. Of course sprocket 31 derives its motion from the movement of wheel 52.

While my improved drill has been described as an integral article it is to be understood that conventional drills may be equipped with mechanisms embodying the principles of the present invention.

Although the present invention has been described in conjunction with particular embodiments thereof, it is to be understood that modifications and variations may be made without departing from the scope of specification and the claims as those skilled in the art will readily understand. Thus the inner tube of the depositing means need not be disposed centrally of the casing but may be off set. Likewise means other than metering plates may be used for accurately predetermining quantities of seed to be delivered to the depositing means. Similarly means other than the planetary gears may be used for actuating the depositing mechanism at predetermined intervals. Such variations and modifications are to be considered within the purview of the specification and the scope of the appended claims.

I claim:

1. In a seed drill, the combination comprising a frame, a seed tank and a fertilizer tank mounted in said frame, means for depositing seed and fertilizer simultaneously, conduit means for connecting said tanks to said depositing means, said depositing means including a fertilizer tube and a seed tube disposed within said fertilizer tube, and means for simultaneously opening the discharge end of said seed tube and of said fertilizer tube to cause discharge of seed and a ring of fertilizer therefrom.

2. In a seed drill, the combination of a frame; a plurality of wheels carrying said frame; a plurality of seed tanks and a plurality of fertilizer tanks mounted in said frame; a plurality of depositing means for distributing seed and fertilizer simultaneously; said depositing means including a fertilizer tube, a seed tube disposed centrally within said fertilizer tube, and closure means associated with said tubes to cause simultaneous discharge of seed and a ring of fertilizer therefrom; and conduit means connecting said seed tanks and said fertilizer tanks with said depositing means.

3. In a seed drill, the combination of a frame; a plurality of wheels carrying said frame, a plurality of seed tanks and a plurality of fertilizer tanks mounted in said frame, a plurality of depositing means, conduit means connecting said tanks and said depositing means, said depositing means including a casing, a movable tube disposed within said casing and dividing the same into a fertilizer chamber and a seed chamber, a rod coaxial with said movable tube, and closure means attached to the lower extremity of said movable tube to normally maintain said fertilizer and said chambers closed and adapted to cooperate with the lower ends of said casing and of said rod to cause simultaneous discharge of seed and a ring of fertilizer therefrom when said movable tube is displaced.

4. In a seed drill, the combination comprising a frame, a plurality of wheels carrying said frame, a plurality of seed tanks and a plurality of fertilizer tanks associated with said frame, a plurality of depositing means, conduit means connecting said tanks and said depositing means, said depositing means including a casing, a movable tube disposed centrally within said casing and dividing said casing into a fertilizer chamber and a seed chamber, a rod coaxial with said movable tube, closure means attached in the region of the lower extremity of said movable tube and adapted to cooperate with the lower ends of said casing and said rod to normally maintain said seed and fertilizer chambers closed and to cause the simultaneous deposit of seed and fertilizer when said movable tube is displaced, means for displacing said movable tube vertically, and means for returning said tube to the original position, whereby said seed and an annulus of fertilizer are discharged simultaneously therewith.

5. In a seed drill, the combination comprising a frame, a plurality of wheels carrying said frame, a plurality of seed tanks and a plurality of fertilizer tanks mounted in said frame, a plurality of depositing means, conduit means connecting said tanks and said depositing means, said depositing means including a casing, a vertically disposed movable tube concentric with said casing and dividing said casing into a fertilizer chamber and a seed chamber, and a rod coaxial with said movable tube, closure means attached in the lower region of said movable tube and adapted to cooperate with the lower ends of said casing and said rod, resilient means to hold said closure means normally in a closed position, and cam actuated means to open said closure means and deposit seed within an annulus of fertilizer deposited simultaneously therewith.

6. In a seed drill, the combination comprising a frame, a plurality of wheels carrying said frame, a plurality of seed tanks and a plurality of fertilizer tanks mounted in said frame, a plurality of depositing means, conduit means connecting said tanks and said depositing means, metering plates disposed within said seed tanks and intermediate to said conduit means and said seed and adapted to deliver seed to said conduit means, said depositing means including a vertical casing, a concentric movable vertical tube disposed within said casing and dividing said casing into a fertilizer chamber and a seed chamber, a rod within said movable tube and coaxial therewith, closure means attached at the lower extremity of said movable tube and adapted to cooperate with the lower ends of said casing and said rod to normally maintain said seed and fertilizer chambers closed, resilient means to maintain said closure means closed, and cam actuated means for vertically displacing said movable tube and for step-by-step angularly displacing said metering plates alternately whereby predetermined quantities of seed and an encircling ring of fertilizer are discharged simultaneously therewith.

7. In a seed drill, the combination comprising a frame, a plurality of wheels carrying said frame, a plurality of seed tanks and a plurality of fertilizer tanks mounted in said frame, a plurality of depositing means, conduit means connecting said tanks and said depositing means, a plurality of wedge-shaped furrow openers attached at the lower extremities of said depositing means adapted to provide furrows having an appreciable bottom width and outwardly sloping sides, relatively all points in said bottom being in the same plane, each of said depositing means including a casing, a coaxially movable tube dividing said casing into a fertilizer chamber and a seed chamber, a coaxial rod within said movable tube, closure means attached at the lower extremity of said movable tube and adapted to cooperate with the lower ends of said casing and said rod to normally maintain said seed and fertilizer chambers closed, a metering plate within said seed tanks and intermediate to said seed and said seed conduit adapted to deliver predetermined quantities of seed to said conduit means, cam actuated means for displacing said movable tube and for angularly displacing said metering plate alternately whereby predetermined quantities of seed and encircling rings of fertilizer are deposited simultaneously at substantially the same level.

8. In a seed drill, the combination comprising a frame, a plurality of wheels carrying said frame, a plurality of seed tanks and a plurality of fertilizer tanks mounted in said frame, a plurality of depositing means, conduit means connecting said tanks and said depositing means, means adapted to open and close said depositing means to deposit predetermined quantities of seed and fertilizer simultaneously, and means actuated by the rotation of said wheels adapted to open and close said depositing means whereby predetermined quantities of seed and encircling rings of fertilizer are deposited at predetermined intervals simultaneously.

9. In a seed drill, the combination comprising a frame, wheels carrying said frame, a seed tank mounted on said frame, a metering plate within said seed tank and actuated by said carrying wheels, a fertilizer tank mounted on said frame, a rotatable metering plate mounted within said fertilizer tank, means adapted to deposit seed and fertilizer, said means including a casing, a vertically displaceable inner tube dividing said casing into a seed chamber and a fertilizer chamber, a helical baffle in said fertilizer chamber adapted to equalize the distribution of fertilizer in said chamber and a rod coaxial with said inner tube, closure means attached at the lower extremity of said displaceable tube adapted to cooperate with the ends of said casing and said rod, and means actuated by the rotation of said wheels to alternately open said closure means and angularly displace said seed metering plate.

LEVI JACK PETTETT.